United States Patent [19]

Brown et al.

[11] 3,869,174
[45] Mar. 4, 1975

[54] WHEEL STRUCTURE FOR DIFFERENT BOLT CIRCLE DIAMETERS

[75] Inventors: Raymond C. Brown, Tarzana; Ronald D. Bokovoy, Sherman Oaks, both of Calif.

[73] Assignee: Superior Industries, Inc., Van Nuys, Calif.

[22] Filed: Mar. 25, 1974

[21] Appl. No.: 454,753

[52] U.S. Cl................................. 301/9 DN, 85/50
[51] Int. Cl................................. B60b 3/16
[58] Field of Search...... 301/9 AN, 9 DN, 36 R, 65; 85/50

[56] References Cited
UNITED STATES PATENTS

| | | | |
|---|---|---|---|
| 2,590,363 | 3/1952 | Adair | 301/9 DN |
| 3,560,052 | 2/1971 | Verdier | 301/9 DN |
| 3,779,610 | 12/1973 | Pansky | 301/9 DN |

*Primary Examiner*—M. Henson Wood, Jr.
*Assistant Examiner*—D. W. Keen
*Attorney, Agent, or Firm*—Fulwider Patton Rieber Lee & Utecht

[57] ABSTRACT

A wheel structure for different bolt circle diameters, including a wheel having a central portion provided with a plurality of circumferentially arranged, equally spaced, and radially elongated lug bolt slots. Each slot is adapted to accept the cylindrical portion of a lug nut which is connected to the lug bolt received within the slot, and each slot is long enough to accommodate a lug bolt lying on any one of three different bolt circle diameters. A feature of the structure is that for all bolt circle diameters the cylindrical lug nut portions engage the sides of the slots to self-position the wheel, but are out of engagement with the ends of the slots. In one embodiment the slots include inwardly projecting circle segments which aid in locating the lug nuts for a particular bolt circle diameter.

3 Claims, 14 Drawing Figures

WHEEL STRUCTURE FOR DIFFERENT BOLT CIRCLE DIAMETERS

BACKGROUND OF THE INVENTION

1. Field of the Invention

The present invention relates to a wheel structure including a wheel having radially elongated lug bolt slots to accept lug bolts lying on different bolt circle diameters.

2. Description of the Prior Art

The wheel drums of automobiles and similar vehicles are provided with lug bolts which threadedly receive lug nuts to mount the vehicle wheels, the lug bolts being circumferentially arranged and equally spaced around the wheel drum on a particular bolt circle diameter. Different automobile manufacturers use different bolt circle diameters for their wheels, the most popular bolt circle diameters being, for example, 5 inches, 4¾ inches, and 4½ inches.

Whenever replacement wheels or sport wheels are purchased by a vehicle owner for mounting in place of the original equipment wheels, the purchaser must select wheels having lug bolt openings lying on a bolt circle coincident with the bolt circle of the original wheels. Various wheel structures and adapters have been advanced in the prior art to enable a replacement or sport wheel to mount upon wheel drums with different bolt circle diameters. Many of these adaptors and wheel structures are unnecessarily costly, complex, or involve the use of special parts which are inconvenient, unsightly, or which permit the replacement wheel to become misaligned or unbalanced. Other prior art structures are deficient in that they adapt the replacement wheel for only two different lug bolt circle diameters, rather than the desired three.

SUMMARY OF THE INVENTION

According to the present invention, a wheel structure is provided for three different bolt circle diameters and which completely avoids the use of adaptors of the type heretofore common in the prior art. Instead, the wheel of the present structure is provided with a plurality of circumferentially arranged, radially elongated slots which are made long enough to accept lug bolts lying upon any one of three different bolt circle diameters, and particularly the popular bolt circle diameters of 5 inches, 4¾ inches and 4½ inches.

The lug nuts of the wheel structure include cylindrical portions dimensioned to closely fit within the slots and bear against the opposite sides of the slot for self-positioning of the wheel, regardless of which of the three diameters of bolt circle is involved. The close tolerance engagement between the lug nuts and the sides of the slots ensures that the wheel cannot become misaligned or unbalanced.

Each slot is radially elongated sufficiently that, regardless of the lug bolt circle diameter involved, the cylindrical portions of the lug nuts do not bear against the end walls of the slots. Although it would appear beneficial for the lug nuts to bear against the slot end wall to transfer operating loads to the wheel, it has been found, surprisingly, that it is important that such engagement not occur. This is because such lack of engagement eliminates any possible offset or differential loading of the lug bolts, which might occur if the lug bolt was misaligned and tilted toward the slot end wall, and which also might occur if the slot was too short or the slot end wall was not parallel with the lug bolt axis.

In one embodiment the lug bolt slots are each provided with opposed circle segments which demarcate three areas, each of which has a center lying upon one of the three bolt circle diameters. The circle segments are conveniently defined by the material which remains when three closely adjacent, overlapping holes are drilled in the wheel to form each slot. The circle segments facilitate proper location of the wheel onto a particular one of the three lug bolt circle diameters.

One modification of the present wheel structure includes lug bolt slots which are each slightly less in width than the diameter of the cylindrical portion of the lug nut which it accommodates. With this arrangement the material of the slot side walls is brinnelled or deformed to accept the lug nut, ensuring efficient load transfer between the wheel drum and the wheel, and also ensuring proper self-positioning of the wheel onto the wheel drum.

By utilizing a wheel structure of the aforementioned character, one of at least three different diameters of lug bolt patterns or arrays can be accommodated without overloading the lug bolts, with good load transfer, with proper self-positioning of the wheel, and without wheel slippage or unbalance.

Other objects and features of the invention will become apparent from consideration of the following description taken in connection with the accompanying drawings.

DESCRIPTION OF THE PREFERRED EMBODIMENTS

Figure 1:
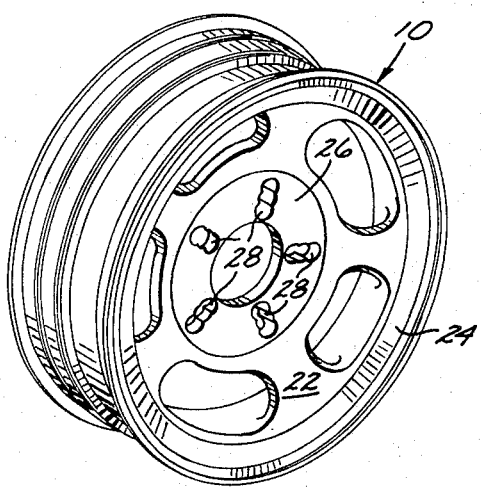
FIG. 1 is a perspective view of a non-ferrous wheel of the present wheel structure.
Figure 2:
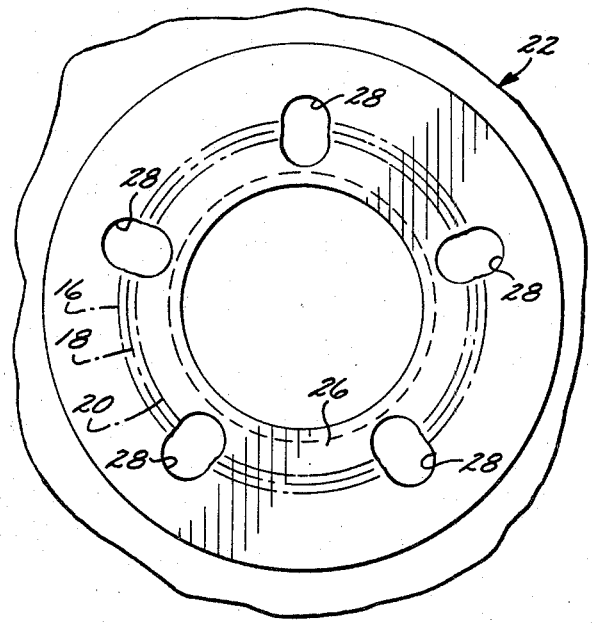
FIG. 2 is an enlarged plan view of the central web portion of the wheel of FIG. 1.

Referring now to the drawings, and particularly to

FIGS. 1–7, there is illustrated a wheel structure 10 according to the present invention which is particularly adpated to be fabricated of cast non-ferrous material such as an aluminum or magnesium alloy. As will be seen, FIGS. 8–14 illustrate a very similar form of wheel structure 10a particularly adapted for fabrication out of stamped or otherwise formed ferrous material such as steel.

Figure 5:
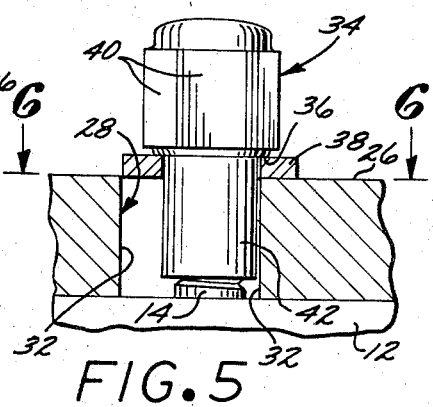
FIG. 5 is a view taken along the line 5—5 of FIG. 4.
Figure 6:
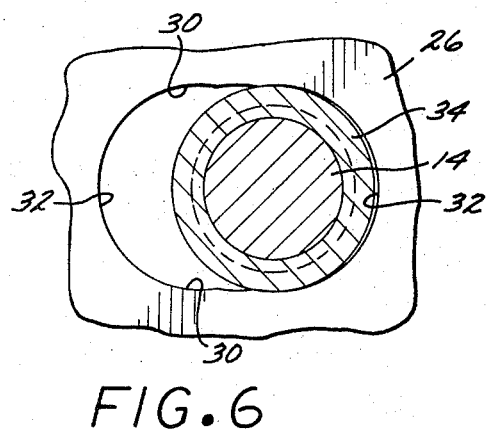
FIG. 6 is a view taken along the line 6—6 of FIG. 5.

The wheel structure 10 includes a conventional wheel drum 12, a portion of which is seen in FIG. 5, having the usual plurality of circumferentially arranged, equally spaced lug bolts 14, one of which is shown in FIG. 5. The longitudinal axes of the bolts 14 lie on a bolt circle 16 of a predetermined diameter. The bolt circle 16 is merely exemplary, since the bolt circle diameter of the wheel drum usually varies from one automobile manufacturer to another. As previously indicated, the most popular bolt circle diameters are 5 inches, 4¾ inches, and 4½ inches, and the wheel structure 10 is adapted to accommodate these three bolt circles. It will be obvious that the present wheel structure could, if desired, be dimensioned to accommodate any other set of three related bolt circles, and the bolt circle diameters specified are therefore merely exemplary. The bolt circle diameter of 5 inches is identified by the numeral 16, while the 4¾ inches and 4½ inches diameters are designated by the numerals 18 and 20, respectively.

Figure 3:
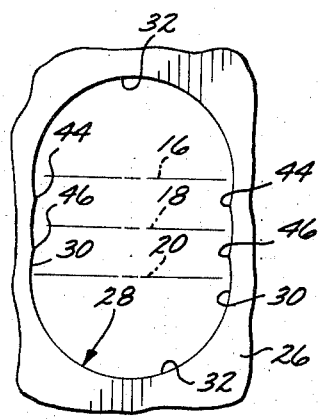
FIG. 3 is a further enlarged view of an area of the wheel central web portion defining one of the lug bolt slots.

The wheel structure 10 also includes a wheel 22 having a conventional wheel rim 24 and a central hub or web portion 26. The web portion 26 includes a plurality of circumferentially arranged, equally spaced, and radially elongated lug bolt slots 28 which are circumferentially located for alignment with the circumferential pattern or array of the lug bolts 14. Each slot 28, as best seen in FIGS. 3 and 5, includes straight, opposite, and radially extending side walls 30 which terminate in semi-circular end walls 34 located at the opposite extremities of the slot 28. The plurality of slots 28 receive the lug bolts 14, respectively, each slot 28 being sufficiently elongated to accommodate not only the lug bolts 14 arranged on the bolt circle 16, as illustrated, but also lug bolts of other wheels (not shown) arranged on the bolt circles indicated at 18 and 20 in FIGS. 2 and 3.

A plurality of flanged lug nuts 34 are internally threaded and threadedly receive the usual threaded extremities of the plurality of lug bolts 14, respectively. The flange 36 of each lug nut 34 bears upon a washer 38 which overlies the associated slot 28, and the upper portion of each lug nut includes usual flats 40 to enable the lug nut to be tightened onto the washer 38 and lug bolt 14, as will be evident.

Each washer 38 is made of a diameter sufficient to overlie the side margins defining the associated slot 38, and sufficient to cover or overlie substantially all of the open area of the slot, regardless of whether the lug bolts are on the bolt circle 16, 18 or 20. This arrangement provides good load transfer from the lug bolt 14 to the wheel 22 and aesthetically conceals the elongation of each slot.

Below the flange 36 of each lug nut 34 is located a bushing section 42 which is cylindrical on its outer surface. The section 42 is disposed through the central opening in the associated washer 38 and closely fits against the side walls 30 of the adjacent slot 28. The fit is a close tolerance fit to correctly position the wheel 22 when all of the bushing sections 42 are in engagement with the side walls 30 of the slots 28. When correctly positioned, the central axis of the wheel 22 is coincident with the central axis of the wheel drum 12, as will be apparent.

Figure 4:
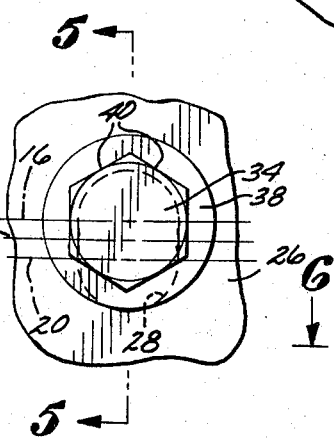
FIG. 4 is a view similar to FIG. 3, on a diminished scale, showing a lug nut and washer in operative position.

As best seen in FIGS. 4 and 5, the bushing section 42 is out of contact with the end wall 32 of the associated slot 28, and this is also true for applications in which the lug bolts lie on bolt circles 18 or 20, rather than bolt circle 16. Consequently, all operational loads are transmitted between the wheel 22 and wheel drum 12 through the engagement between the bushing sections 42 and the slot side walls 30, and through the engagement between the lug nuts 34, the washers 38, and the upper side margins of the slots 28. Non-engagement between the lug nuts 34 and the slot end walls 32 prevents imposition of undesirable bending loads upon the lug bolts 14, which might otherwise occur because of a bent lub bolt or because the slot end walls are not straight and taper inwardly. Making the slots 28 oversize avoids any contact between the lug nuts 34 and the slot end walls 32. A tolerance of 0.01 inch at each end of the slot 28 is sufficient for the cast aluminum alloy wheel 10.

With particular reference to FIG. 3, the preferred form of slot 28 is characterized by side walls 30 which include a first pair of opposed, inwardly projecting scallop portions or circle segments 44, and an adjacent second pair of similar segments 46, the segments 44 and 46 being arranged to divide or demarcate the area of the slot into three adjacent areas whose centers lie upon the bolt circles 16, 18, and 20, respectively. The circle segments 44 and 46 thus aid in properly locating the lug nuts 34 in position for the particular lug bolt circles involved.

The circle segments 44 and 46 are most conveniently formed by making three adjacent, overlapping drilled openings in the wheel, on the diameters 16, 18 and 20, to form the lug bolt slot. The scallops or inwardly projecting segments of the slot side walls 30 which such drilling does not remove form the circle segments 44 and 46.

Figure 7:
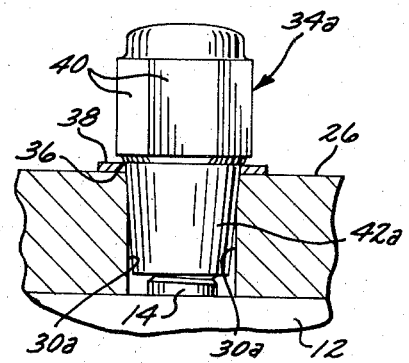
FIG. 7 is a cross-sectional view of a modified form of lug nut and slot combination, the view being taken across the slot.
Figure 8:
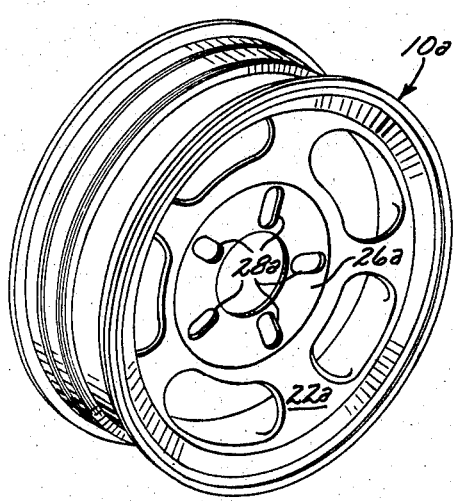
FIG. 8 is a view similar to FIG. 1, but illustrating a ferrous wheel.
Figure 9:
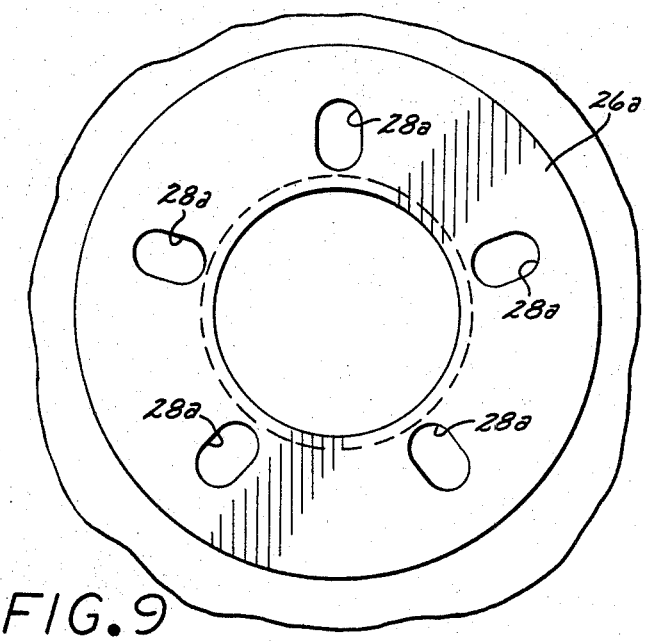
FIG. 9 is an enlarged plan view of the central web portion of the wheel of FIG. 8.
Figure 10:
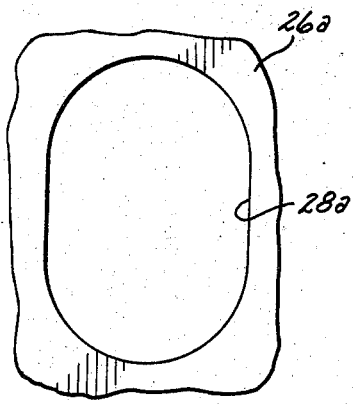
FIG. 10 is a further enlarged view of an area of the wheel central web portion defining
Figure 11:
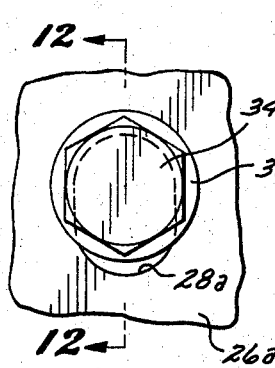
FIG. 11 is a view similar to FIG. 10, on a diminished scale, showing a lug nut and washer in operative position.
Figure 12:
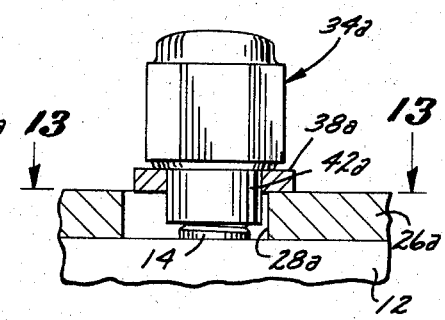
FIG. 12 is a view taken along the line 12—12 of FIG. 11.
Figure 13:
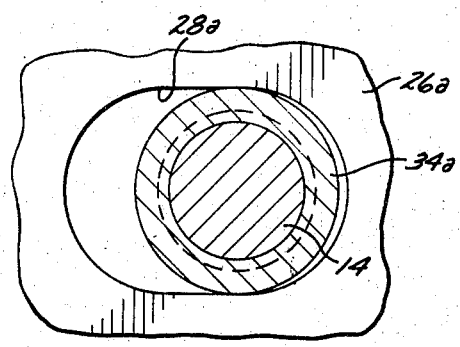
FIG. 13 is a view taken along the line 13—13 of FIG. 12.

As best seen in FIG. 7, a modification may be made in the wheel structure to insure an absolutely close fit between the bushing sections 42 and the slot side walls. This is done by using a different form of lug nut 34a having a bushing section 42a which tapers inwardly in a downwardly direction, as viewed in FIg. 7. In addition, the slots provided in the wheel are characterized by side walls 30a spaced apart a distance less than the maximum diameter of the tapered bushing section 42a. With this arrangement, the lug nuts 42a slightly deform the material of the slot side walls 30a and thereby insure an exact fit between the lug nuts 34a and the slots 30a, consequently insuring very accurate self-positioning of the wheel and good transfer of operational loads. If desired, the bushing section of the lug nuts could be made cylindrical, but this would require special effort to deform the slot side walls 30a, as will be apparent. Normal wheel nut torques will provide approximately 0.005 inch depth of deformation on both sides of the lug nut bushing section.

Referring now to FIGS. 8–14, the wheel structure 10a is substantially identical to the wheel structure 10 just described, except that the greater strength of the steel allows the thickness of the wheel central section 26 to be made somewhat thinner. Consequently, the depth or length of the bushing section 42a of each lug nut 34a is shorter. In addition, for the steel wheel 22a, the extra tolerance at each end of the slot 30b can be less than that of the slot 30, being as little as 0.0015 inch at each end. This is sufficient to provide the desired assurance that the lug nuts 34a will always be out of contact with the slot end walls.

The bearing area required between the lug nuts 34a and the wheel 22a can be less with a steel wheel, so the diameter of washer 38a is conveniently smaller than that of the washer 38 used in the wheel of the first embodiment.

In the steel wheel 22a the slots 28a do not include any circle segments 44 and 46, the close tolerance interengagement between the bushing sections 42a and the steel material of the slot side walls being sufficiently close to provide the desired self-positioning of the wheel.

Figure 14:
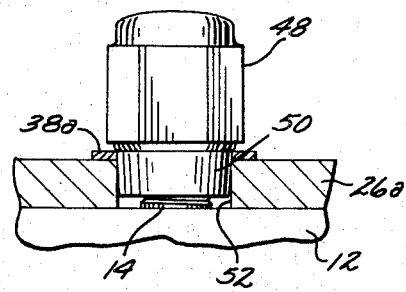
FIG. 14 is a cross-sectional view of a modified form of lug nut and slot combination, the view being taken across the slot.

FIG. 14 illustrates a modification of the lug nut 34a and the slot 28a similar to the modification illustrated in FIG. 7 and described in connection with the wheel structure 10. More particularly, lug nuts 48 are utilized which each include a slightly tapered bushing section 50 for location within a corresponding lug bolt slot. A slot 52 is provided having a width slightly less than the diameter of the bushing section 50 so that the material of the slot side walls is deformed when the lug nuts 48 are mounted in position upon the associated lug bolts, as illustrated. This provides a close tolerance fit in the same manner described in connection with the modification of FIG. 7.

From the foregoing it is seen that the wheel structures of the present invention provide a unique means for mounting replacement or sport wheels onto wheel drums of different bolt circle diameters. The mounted wheel is automatically positioned in a positive and reliable fashion, without any need for complex, costly, or specialized fittings or adaptors.

Various modifications and changes may be made with regard to the foregoing detailed description without departing from the spirit of the invention.

We claim:

1. A wheel structure for different bolt circle diameters comprising:

a wheel drum including a first plurality of circumferentially arranged, equally spaced lug bolts, said lug bolts having axes lying on a bolt circle of a first diameter;

a wheel having a central web portion which includes a plurality of circumferentially arranged, equally spaced, and radially elongated lug bolt slots, each said slot having opposite, radially extending side walls terminating in semicircular end walls at the opposite extremities of said slot, said slots receiving said lug bolts, respectively, each said slot being elongated sufficiently to receive, instead of said first plurality of lug bolts, a second plurality or a third plurality of lug bolts lying, respectively, on bolt circles of second and third diameters different from said first diameter;

a plurality of washers fitting over said first plurality of lug bolts, respectively, and substantially covering said slots;

a plurality of flanged, internally threaded lug nuts threadedly connected to said first plurality of lug bolts, respectively, the flanges of said lug nuts bearing upon said washers, respectively, each of said lug nuts having an outer cylindrical bushing section extending through the adjacent one of said washers and into the adjacent one of said slots in close tolerance engagement with said side walls of the slot, said bushing sections being out of engagement with said end walls of the slot whether threadedly connected to said first plurality, said second plurality, or said third plurality of lug bolts whereby said wheel is self-positioning through said engagement between said bushing sections and said side walls and whereby operating loads are transmitted to said wheel through said engagement and through said bearing.

2. A wheel structure according to claim 1 wherein said side walls of each said slot include a first pair of opposed, inwardly projecting circle segments, and further include an adjacent second pair of opposed, inwardly projecting circle segments, said first and second pairs of circle segments being arranged to demarcate the area of each said slot into three areas whose centers lie upon bolt circles of said first, second, and third diameters, respectively, whereby said circle segments aid in properly locating said first, second and third pluralities of lug bolts.

3. A wheel structure according to claim 1 wherein each said bushing section has a diameter slightly greater than the width of the complemental portion of the associated one of said slots whereby said side walls of said slot are deformed to receive said bushing section.

* * * * *